INVENTOR.
CLAUDE J. MENARD
BY
ATTORNEY

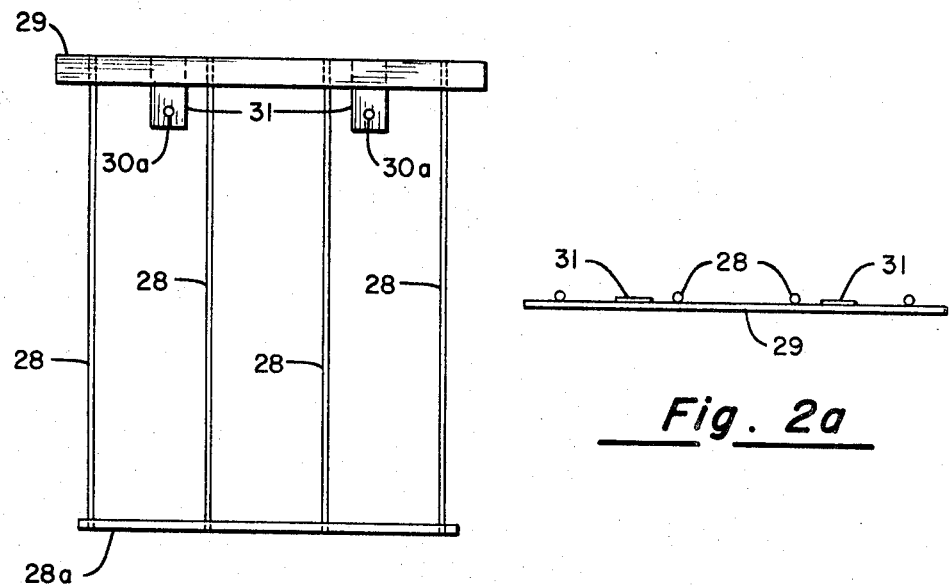
Fig. 2
Fig. 2a
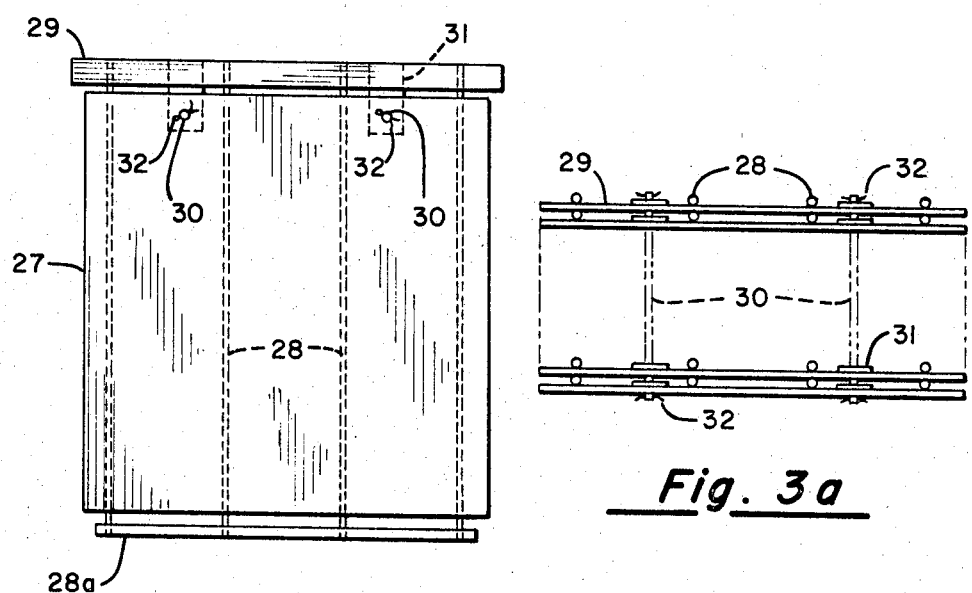
Fig. 3
Fig. 3a

INVENTOR.
CLAUDE J. MENARD

United States Patent Office 3,442,710
Patented May 6, 1969

3,442,710
METHOD OF IMPREGNATING POROUS NICKEL ELECTRODES WITH ACTIVE MATERIAL
Claude J. Menard, St. Paul, Minn., assignor to Gould-National Batteries, Inc., a corporation of Delaware
Filed Oct. 16, 1964, Ser. No. 404,308
Int. Cl. H01m 43/04
U.S. Cl. 136—29          11 Claims This invention relates to improvements in methods for processing electrodes for storage batteries and particularly to methods for impregnating porous plaques or conductive matrices with active material by improved thermal decomposition treatment.

Heretofore positive plates or electrodes for nickel-cadmium storage batteries have utilized porous sintered nickel plaques or matrices impregnated with active material. The impregnation of such plaques with sufficient nickel hydroxide to provide highest capacity has presented a difficult problem in that it requires, for economic reasons, numerous applications of reactive chemicals and heat treatment of accurately controlled duration and at predetermined temperatures. A previously known treatment of such plaques includes the steps of immersion in molten nickel nitrate $(Ni(NO_3)_2)$ at approximately 80° C. for a definite period of time; removal from the impregnation bath, draining, placing the plaques in an oven where they are treated for a further period of time at a higher temperature, allowing them to cool, then immersing them in potassium hydroxide solution for a longer period of time, washing in hot water for a period of hours for the complete removal of all KOH, and then drying them in an oven where they are maintained at approximately 80° C. for a further period of time. This series of treatment steps must be repeated a number of times to complete the conversion of the nickel nitrate to $Ni(OH)^2$. Such conversion by thermal decomposition is a batch treatment which requires so many accurately timed operations that it has been difficult to maintain uniformity of product quality between batches in practice. An example of such a method is described in U.S. Patent No. 2,831,044, granted Apr. 15, 1958, to Pierre L. Bourgault et al.

The principal objects of the present invention are to improve the quality including the capacity of the electrodes, to produce a more uniform product and to reduce the cost of manufacture by providing a novel series of chemical and heat treatment steps, including vacuum decomposition, which result in complete impregnation of active material in the pores of the nickel matrices or plaques.

A particular object is to provide a method of impregnating porous nickel electrodes with active material which comprises impregnating the matrices with nickel nitrate solution of selected specific gravity and at a temperature not exceeding 100° C., then decomposing the nitrate in the pores of the matrices under predetermined vacuum and at a temperature within the range 150° C. to 300° C. for a predetermined period of time, soaking the matrices containing the decomposed nitrate in an hydroxide solution, separating the electrodes from the excess hydroxide solution and washing the electrodes in water.

The present invention may be characterized as a vacuum process for decomposing the nitrate remaining in the pores of the conductive matrices at a temperature of 150° C. to 300° C. for a period of time from about fifteen minutes to about thirty-five minutes. This decomposition of the nitrate under vacuum is followed by the soaking of the matrices containing the decomposed nitrate in a solution of potassium hydroxide or sodium hydroxide. For optimum results the electrode matrices are impregnated with nickel nitrate solution of specific gravity of approximately 1.78–1.80 at a temperature within the range 70° C. to 100° C. As shown by the comparative tests hereinafter described the efficiencies of vacuum processed electrodes in sealed cells is greater than the theoretical value based on the amount of active material in the plates, assuming that nickel hydroxide $Ni(OH)_2$ is the active material obtained by the thermal decomposition process heretofore known. These high efficiencies may indicate that the form of the active material obtained by my vacuum decomposition process is more effective than the nickel hydroxide obtained by the thermal decomposition process heretofore known. Comparative tests further show that the plate capacity obtained by my process is increased by about 50% over that obtained by the thermal decomposition method of the prior art.

Referring to the accompanying drawings:

FIGS. 2 and 2A are side elevational and end views respectively showing a suitable spacer unit for the matrices or plaques in a reaction vessel such as that shown in FIG. 1;

FIGS. 3 and 3A are respectively a side elevational and end view of a group of matrices assembled with spacers for insertion in the reaction vessel;

Figure 1:
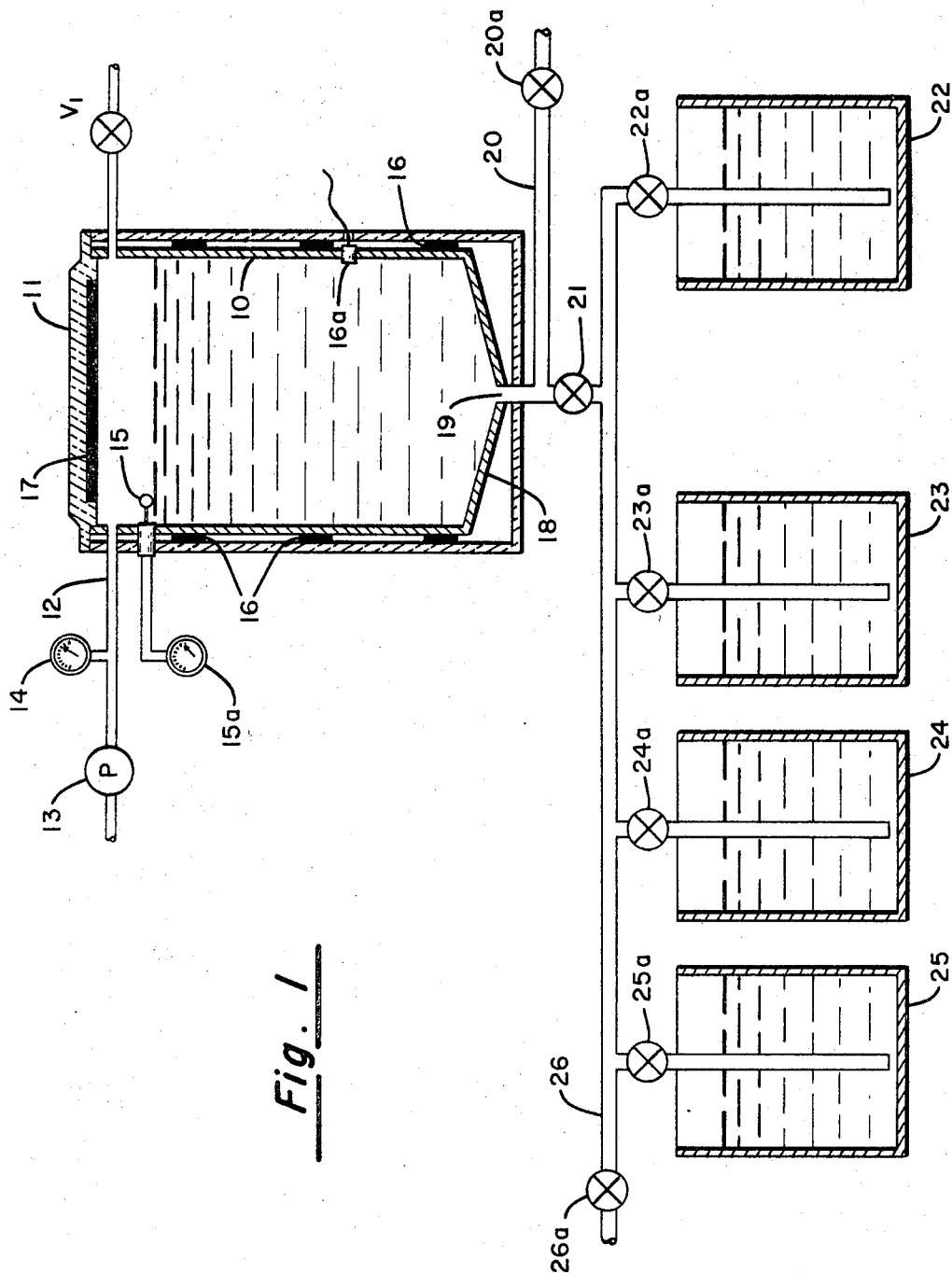
FIGURE 1 is a schematic view showing suitable processing apparatus including a reaction vessel for carrying out my invention.

Referring to FIG. 1 of the drawings, a reaction vessel 10 is shown in normal closed position with its top closure 11. This closure is removed to permit the insertion and withdrawal of groups of plaques or matrices and for the removal of impregnated plaques. A conduit 12 communicates with the upper portion of the vessel 10 and is connected by branch conduits to a vacuum pump 13 and a vacuum gauge 14. Also communicating with the upper portion of the vessel 10 is a vacuum release valve VI and mounted within the vessel 10 is a liquid level indicator 15 connected to a gauge 15a for showing the liquid level. A plurality of heating elements indicated at 16 are arranged to encircle the walls of the vessel and the removable top closure 11 has heating elements 17 mounted on the lower side thereof. A temperature controller probe is indicated at 16a and is included in an electric circuit adapted to regulate the temperature of the reaction vessel as required to maintain the predetermined optimum heat treatment temperature.

A bottom wall 18 of the vessel 10 is provided with a centrally located port 19 through which liquids may be passed into the vessel and withdrawn therefrom under control of suitably located valves in liquid supply and discharge conduits. The conduits may include a water supply conduit 20, preferably extending to a source of deionized water and a valve 20a for controlling flow of water to the reaction vessel. Another valve 21 is provided to control flow to and from the port 19. Chemical solutions for treating the plaques or matrices may be supplied from tanks indicated at 22, 23, 24 and 25 through branch conduits severally connecting the tanks to the valve 21 under control of valves 22a, 23a, 24a and 25a. Any selected solution may be drained to waste through a branch conduit 26 under control of a valve 26a.

Active material for the positive plates of nickel cadmium batteries of a common type is impregnated in the pores of sintered nickel plaques. A group of such plaques adapted to be placed in the reaction vessel 10 are shown in FIGS. 3 and 3A with suitable spacers. The several plaques are indicated at 27 and are separated one from another by spaced parallel spacer rods 28 of predetermined diameter adapted to insure a sufficient but not excessive volume of treatment liquid between adjacent plaques. A suitable group of spacer rods 28 is shown in FIGS. 2 and 2A. The rods are connected in spaced parallel relation one to another in a common plane by cross bars 28a and 29 to which the rods may be welded or otherwise secured. The several spacers may be connected together in a group by rods 30 extending through apertures 30a formed in tabs 31 projecting from each bar 29. Cotter keys 32 or other suitable fastening means may be used at the ends of the rods 30 to confine the group of plaques and spacers as a unit or pack adapted to fit in the reaction vessel 10. The latter is generally rectangular in horizontal cross sectional shape and is of such size as to contain a predetermined number of the plaques, spacers and the additional liquid that is required for the chemical and other treatment. For example, the liquid capacity of the reaction vessel 10 for receiving ninety plaques of type 1.2 S.C. each of 96 square inch size may have a capacity of 10.5 gallons equal to 4.6 cc. per square inch of plaque surface. In order to provide this volume of liquid between the plaques, rods 28 of .0625 inch diameter are provided as spacers in each pack of plaques in the vessel 10.

In one series of tests the plaques were loaded into the reaction vessel and were retained there througout the various operations which were (1) impregnation with positive active material; (2) chemical formation, and (3) impregnation with an anti-polar mass. Thus the solutions only were moved. The vacuum decomposition temperature was from 150° C. to 250° C., as indicated by the temperature controller.

As hereinbefore indicated, the present invention is concerned primarily with the features and details of vacuum impregnation of positive active material. A related process for chemically forming the electrodes is described and claimed in my pending application Ser. No. 313,173, now Patent No. 3,304,204, filed Oct. 2, 1963.

EXAMPLE OF PROCEDURE

At the start of a treatment cycle using the apparatus shown in FIGS. 1, 2 and 3, the sintered plaques to be treated are charged into the reaction vessel 10 in packs with the spacers hereinbefore described. The vessel is then closed and the vacuum pump 13 is operated so that air is evacuated from the vessel 10, the vacuum release valve VI and other valves being closed. Heating elements 16 and 17 are energized to heat the vessel 10.

(a) Nickel nitrate soak

Nickel nitrate solution $Ni(NO_3)_2 \cdot bH_2O$ is then admitted to the vessel by opening the valves 21 and 22a so that the reaction vessel is filled with nitrate solution having specific gravity of approximately $1.79 \mp 0.010$ at $85° \mp 5°$ C. Acid should be added from time to time as the need arises to maintain the pH of the nickel nitrate solution approximately in the range of 1.5 to 2.0. The porous plaques are soaked for a period of approximately two minutes in this solution.

Following this soaking of the plaques, the nitrate solution is drained from the reacion vessel by releasing the vacuum therein and opening the valves required to allow the solution to return to the tank 22. Soaking in nickel nitrate is then repeated and the solution is again returned to the nickel nitrate tank. At this stage of the operation the temperature in the reaction vessel should not exceed 130° C. The draining of this first solution is continued while the temperature in the reaction vessel is retained between 160° and 180° C.

(b) Decomposition under vacuum

A vacuum of approximately $60 \mp 5$ cm. of mercury is now established in the reaction vessel and the temperature therein is raised to $250° \mp 10°$ C. Experimentation has shown that the decomposition can be accomplished with favorable results under vacuum ranging between 40 and 70 cm. of mercury although $60 \mp 5$ cm. of mercury appears preferable. The establishement of the vacuum and temperature indicated may require up to 12 minutes, and this temperature is maintained for at least 13 additional minutes so that the total vacuum decomposition time is approximately 25 minutes. At the end of this time the heating elements are deenergized.

(c) Precipitation in KOH

The reaction vessel 10 is then filled with a second solution consisting of an 11% solution of KOH from tank 23 by suitable operation of the flow control valves. An equivalent NaOH solution may be substituted for the KOH. The temperature of the vessel is adjusted to be in the range of 70–100° C. and preferably approximately $85° \mp 5°$ C. and the electrodes are soaked in the hydroxide for approximately 15 minutes after the vessel has been filled. The soak temperature may range from room temperature up to approximately 100° C. with effective results. The KOH solution (solution No. 2) is then drained to waste after releasing the vacuum in the reaction vessel and opening drain valve 26a in the conduit 26.

(d) Water rinse

The reaction vessel is then filled with hot deionized water at a temperature of approximately $74° \pm 5°$ C. and the electrodes are soaked for from two to ten minutes, preferably approximately 4 minutes after the vessel has been filled with water. The water temperature may be higher but should not exceed 100° C. The rinse water is finally drained to waste. The water rinse treatment should then be repeated a number of times. Five such treatments is usually sufficient although the rinse may be repeated from two to six times. The partially impregnated plaques may then be dried in the reaction vessel at a temperature of approximately 250° C. and under suitable vacuum, e.g., 70 cm. of Hg. Experience has shown that drying in a vacuum in the range of 40 to 70 cm. of Hg works effectively.

REPETITION OF IMPREGNATION TREATMENT

To produce electrodes of maximum efficiency, minimum nitrate content and maximum capacity, the treatment steps hereinbefore described under (a) nickel nitrate soak, (b) decomposition under vacuum, (c) precipitation in KOH, and (d) water rinse are repeated two or three times or until the desired amount of active material is obtained.

COMPARATIVE TESTS

A large number of comparative tests were run wherein the characteristics of electrodes made according to the present invention were compared with those of electrodes made according to a commercially successful thermal decomposition method, hereinafter referred to as the standard thermal or standard decomposition method. Electrodes of this standard thermal decomposition type which were used in comparative tests had been impregnated with active material ($Ni(OH)_2$) substantially as hereinbefore described except that the standard decomposition treatment was conducted under substantially atmospheric pressure at high temperatures. It had also been found necessary for the standard impregnation process to space the plaques in the reaction vessel 0.188 inch or more one from another in order to provide sufficient active material for each impregnation equal to that of the vacuum process wherein plaque spacing ranges from about .03 inch to about 0.06 inch depending on the size of the plaques is adequate and most economical. The electrodes which were used in the comparative tests hereinafter described are referred to as standard thermal decomposition type and vacuum decomposition type respectively. The following table shows the results of one series of comparative tests:

TABLE I.—TYPICAL COMPARATIVE DATA: VACUUM PROCESS vs. THERMAL PROCESS

Decomposition: 15 to 35 Minutes at 150° C. to 250° C.
Sintered Nickel Plaques of similar thickness and weights.
Same processing conditions for both methods except for the decomposition pressures.

| Type of decomposition | Amt. of active material, gm./in.$^2$ | Measured sealed cell capacity,[1] AH | Ratio measured capacity to amt. active material | Average sealed cell efficiency[2] |
|---|---|---|---|---|
| Thermal | 0.544 | 1.222 (1.163–1.319) | 2.25 | 81.8 |
| Do | .555 | 1.194 (1.118–1.272) | 2.15 | 78.3 |
| Do | .573 | 1.178 (1.077–1.325) | 2.05 | 74.8 |
| Vacuum | .544 | 1.760 | 3.23 | 117.7 |
| Do | .571 | 1.766 (1.688–1.833) | 3.10 | 112.5 |
| Do | .572 | 1.814 (1.748–1.883) | 3.17 | 115.2 |
| Do | .577 | 1.778 (1.665–1.883) | 3.08 | 112.5 |
| Do | .577 | 1.830 (1.763–1.888) | 3.17 | 115.7 |
| Do | .586 | 1.780 (1.764–1.799) | 3.04 | 110.4 |
| Do | .588 | 1.851 (1.768–1.925) | 3.15 | 114.4 |
| Do | .593 | 1.904 (1.815–2.008) | 3.21 | 116.5 |
| Do | .597 | 1.853 (1.800–1.920) | 3.11 | 112.7 |

[1] Values in parentheses show capacity range; averages of 2nd and 3rd cycles.
[2] Assuming Ni(OH)$_2$ as the active material.

It will be evident from the first column of this table that the quantity of active material in grams per square inch of plate obtained by the vacuum decomposition treatment is only slightly greater than that obtained by the standard thermal method. However, the measured sealed cell capacity in ampere hours (column 2) obtained by the vacuum process averages approximately 50% greater than that obtained by the thermal process and the ratio of measured capacity to amount of active material (column 3) is approximately 50% greater in the electrodes treated by the vacuum decomposition process as compared with those produced by the standard or thermal decomposition process. Moreover, as shown by the fourth column of comparative test results the efficiency percentage of the plates in the sealed cells in relation to the theoretical capacity, assuming that nickel hydroxide (Ni(OH)$_2$) is the active material ranged from 74.8% to 81.8% in the case of the electrodes produced by thermal decomposition, whereas those produced by my vacuum process ranged from 110.4% to 117.7% of the theoretical efficiency. These tests indicate that the active material obtained by my vacuum decomposition process is at least in some respects different and more effective than that obtained by the standard thermal decomposition process.

Figure 4:
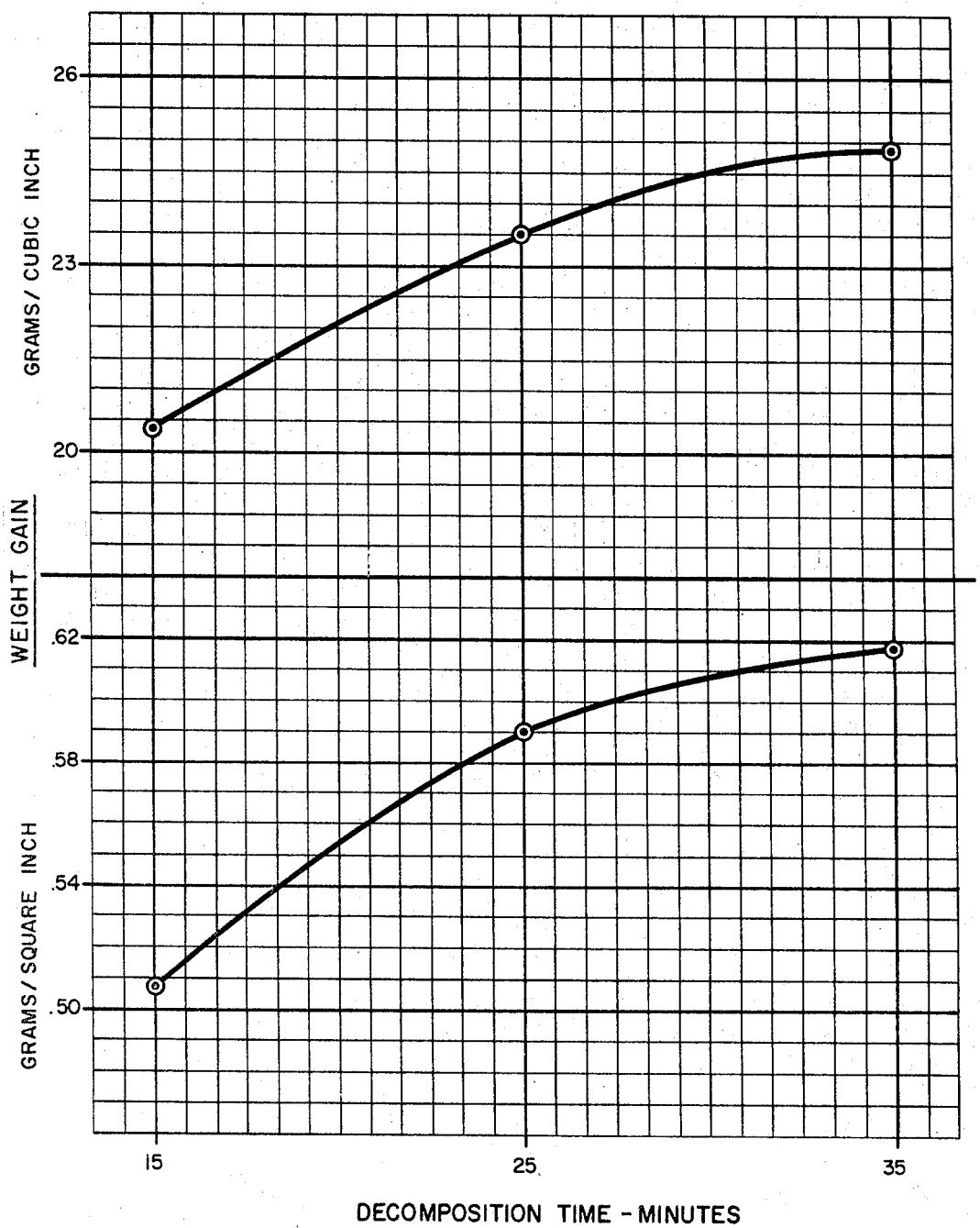
FIG. 4 is a graph showing typical weight gains of plaques in grams per square inch and grams per cubic inch resulting from vacuum decomposition for periods of time ranging from 15 to 35 minutes.
Figure 5:
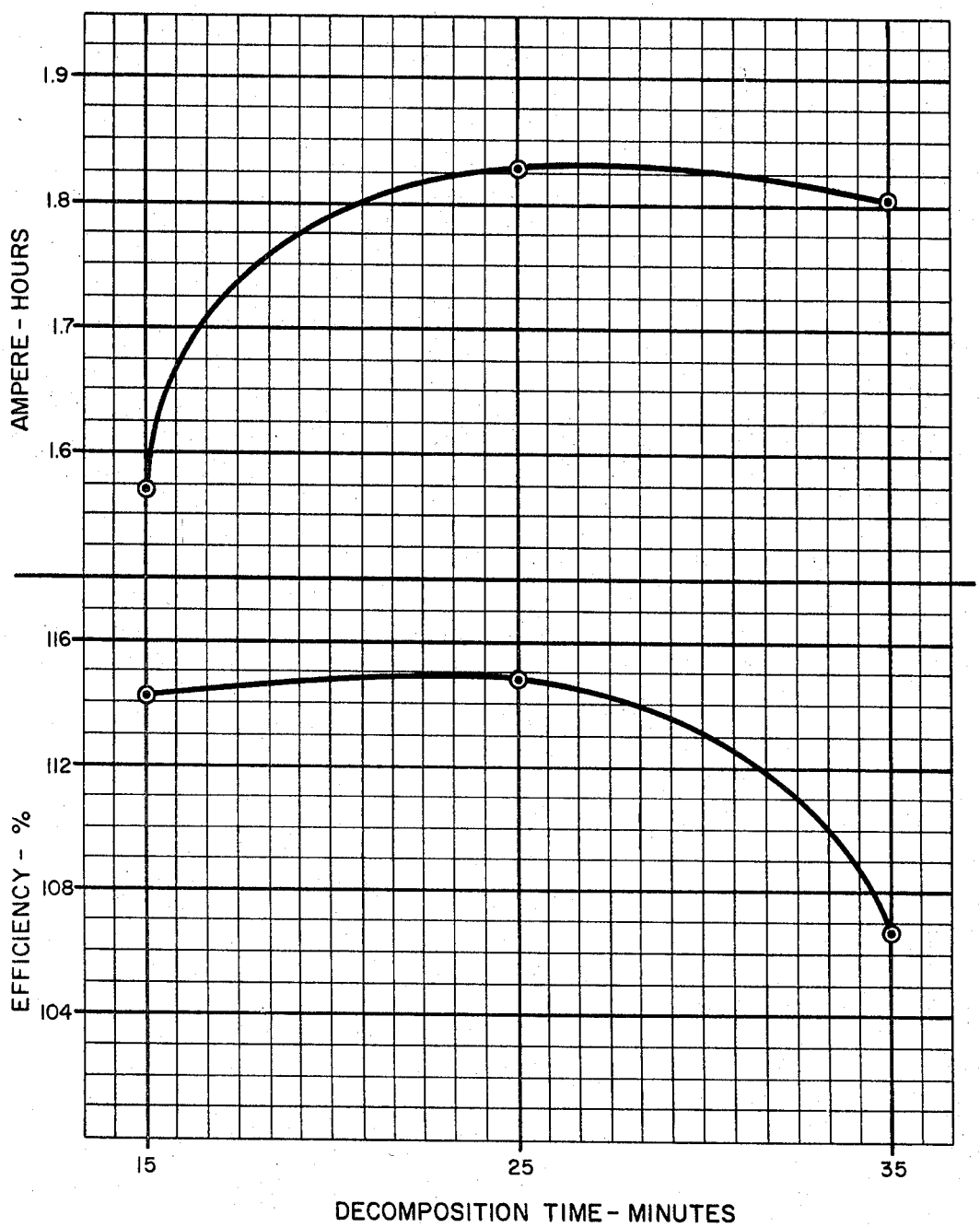
FIG. 5 is a graph showing typical sealed cell capacities and efficiencies resulting from various vacuum decomposition time treatments.

The graphs of FIGS. 4 and 5 of the drawings show the affect of the duration of the vacuum decomposition treatment within the range 15 minutes to 35 minutes. The graph shown in the lower portion of FIG. 4 was obtained by plotting plate weight gains in grams per square inch of the electrodes against decomposition time, and the upper portion of FIG. 4 shows the weight gains in grams per cubic inch of electrode as affected by duration of decomposition treatment under vacuum. Thus, the maximum weight gain per square inch of electrode is approximately 0.62 gm. for the 35 minute decomposition treatment. A weight gain of approximately .51 gm. per square inch is obtained by the 15 minute decomposition treatment.

FIG. 5 illustrates the effect of various decomposition time treatments on the sealed cell capacity and efficiency. In the tests from which these results were obtained the discharge rate was 0.3 ampere, the cell type 1.2 S. C., and the values shown in parentheses are average values after two and three sealed cell charge-discharge cycles respectively. It will be evident that the efficiency percent ranged from approximately 114 for the 15 minute decomposition treatment to slightly higher than 106% efficiency for the 35 minute decomposition time. As shown by the upper graph (FIG. 5) the ampere-hour capacity of the 1.2 S.C. cell ranged from approximately 1.57 ampere-hours for the 15 minute treatment to approximately 1.85 for the 25 minute treatment, and 1.8 ampere-hours for the 35 minute treatment.

Figure 6:
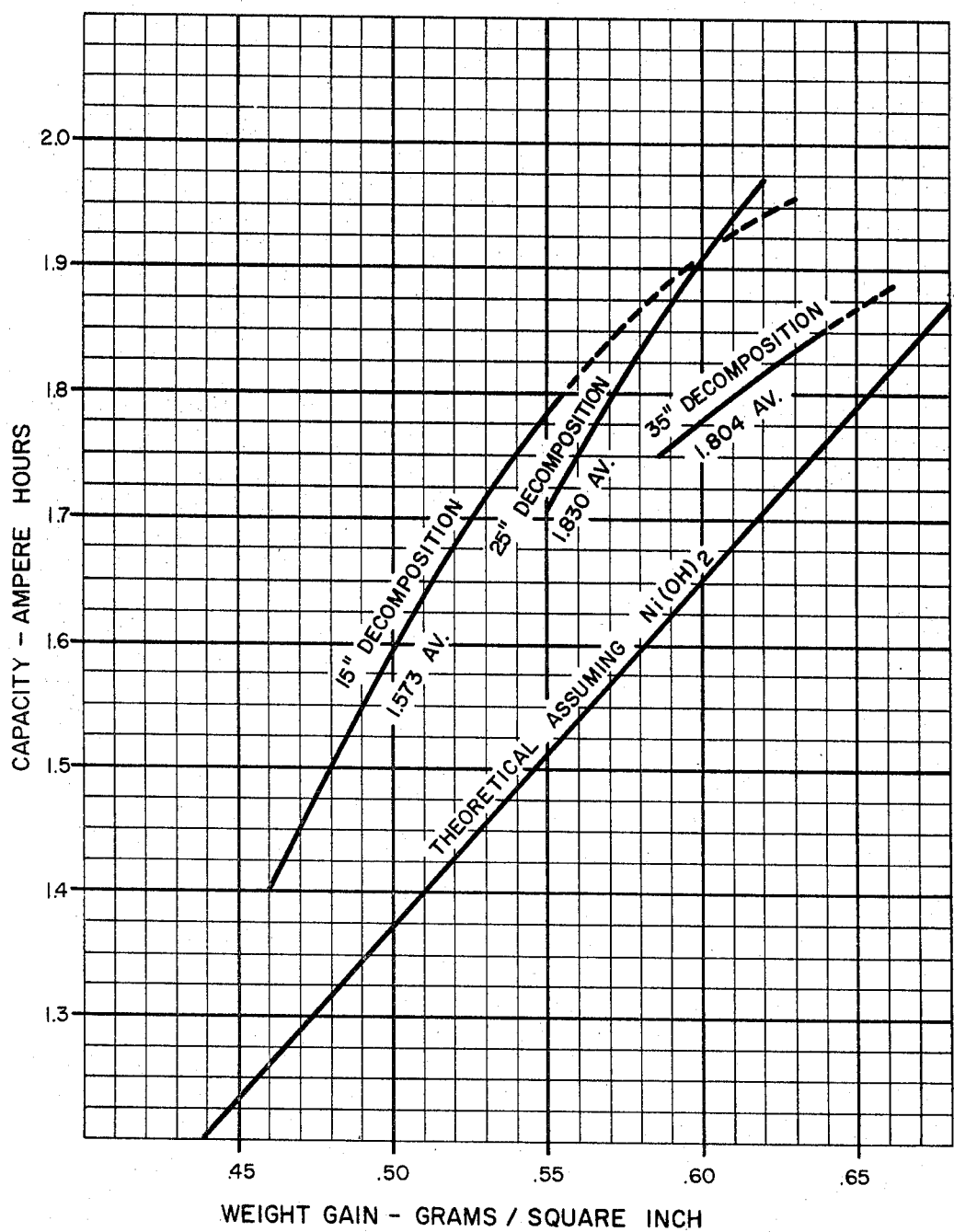
FIG. 6 is a graph showing typical sealed cell capacities in ampere-hours plotted against weight gains resulting from vacuum decomposition treatments of durations of 15, 25 and 35 minutes.

The graphs shown in FIG. 6 were obtained by plotting weight gain in grams per square inch of electrode against capacity in ampere hours in tests of sealed cells having electrodes made according to the present invention. These were cells of type 1.2 S. C. which were discharged at the rate 0.3 ampere. The several graphs show the effect of 15 minutes, 25 minutes and 35 minutes respectively of decomposition treatment. The capacity of the test cells containing electrodes treated for 15 minutes of decomposition time averaged 1.573 ampere-hours, those having the 25 minute decomposition treatment averaged 1.830 ampere-hours and 1.804 ampere-hours was the average capacity of the cells containing the positive electrodes which had been subjected to the 35 minute decomposition treatment under vacuum. For comparison with these values FIG. 6 also includes a graph showing the "theoretical" capacity of these test cells plotted against weight gain in grams per square inch. These theoretical values assume that the active material is Ni(OH)$_2$.

Further details of plaques and weight gains obtained by vacuum decomposition process is shown by the following table:

TABLE II.—EFFECT OF DECOMPOSITION TIME ON WEIGHT GAIN

Number of plaques per batch: 90 (3 packs of 30 plaques each as one layer)
Plaque area: 96 in.$^2$—Vacuum during decomposition: Approximately 60 cm. Hg., decomposition temperature: 150° C. to 250° C. on indicating controller

| Decomposition time (minutes) | Original plaque | | | Weight gain | |
|---|---|---|---|---|---|
| | Thickness (in.) | Weight (gm.) | Density (gm./cc.) | Gm./in.$^2$ | Gm./in.$^3$ |
| 15 | 0.0251 | 76.6 | 1.958 | 0.508 | 20.25 |
| 25 | .0250 | 75.1 | 1.966 | .590 | 23.60 |
| 35 | .249 | 77.1 | 2.057 | .618 | 24.83 |

NITRATE CONTENT OF PLATES

As is well known in the art, charge retention is adversely affected by the presence of nitrate in the positive plates. Improved charge retention properties are obtained by my decomposition process as a result of the low nitrate content of the finished positive plates. Specifically, average NO$_3$ content percentages by weight on the order of 0.4% or less remain in my improved plates. For best results in this respect the plaques containing the decomposed nitrate are soaked in 10% to 25% KOH at 85° C., for approximately 15 minutes. This is followed by four to six washings in water at about 70° to 80° C. to produce plates having nitrate content on the order of 0.4 or less.

To summarize, my tests indicate that soaking of the plaques containing vacuum decompose nickel nitrate in the hot caustic solution at about 85° C. for about 15 minutes is most effective. The amount of nitrate in the plates compares favorably with that in the best of those produced by the prior production decomposition process. No significant differences were noted over a concentration range of 10% to 25% KOH solution for a solution volume of 4.6 cc. per square inch of plates. Six soaks of four minutes each in hot water, 55° C. or higher, is sufficient.

TREATMENT EQUIPMENT

As hereinbefore pointed out, the conductive matrices or plaques may be retained in a reaction vessel, such as the vessel 10 shown in FIG. 1, throughout the impregnation treatment. This, however, is not essential and it may be advantageous to utilize as an alternative, modified apparatus including a second reaction vessel to which the packs of spaced matrices to be impregnated are transferred for selected treatment steps. For example, a second vessel may be provided to receive the matrices for the soaking in caustic solution and subsequent washing and/or drying of the wholly or partially impregnated plates or electrodes. Thus a second reaction vessel may be filled with a solution of KOH and the temperature of the second vessel may be adjusted to the desired temperature, for example, approximately 85° C. This may be followed by the draining to waste or other separation of the caustic solution from the plaques. The second vessel may then be filled with the hot water in which the electrodes are soaked for a predetermined time, e.g., 4 minutes, and the rinsing in water may be repeated as required in the second vessel. The transfer of the packs of electrodes and spacers from one vessel to the other may be accomplished quickly and easily and transfers may be timed so that both reaction vessels are in use substantially continuously.

SUMMARY OF RESULTS OF VACUUM DECOMPOSITION PROCESSING

As shown by the comparative tests hereinbefore described with reference to Table I, the plate capacity is increased by about 50% when treated by my vacuum decomposition process. For the purpose of comparison, the plates selected for the tests set forth in Table I had similar amounts of active material and were of the same size. This table and the graphs shown in FIGS. 5 and 6 of the drawings indicate that the efficiencies of the vacuum processed electrodes exceed 100% of the theoretical values based on the amount of active material obtained by the prior thermal process. These high efficiencies indicate that the active material produced by the vacuum decomposition processes is chemically different and more effective than that obtained by the prior thermal process. The exact nature of this improved active material is not known.

FIG. 6 of the drawings further shows that the efficiencies of the electrodes are high over a wide range of active material weight gains and is not restricted to the values shown in Table I. The same cannot be said with respect to plates made by the prior thermal process, since the cell efficiency dropped with increased weight gains above a value of about 0.54 gram per square inch. Weight gains of the prior thermally processed plates lower than 0.544 gram per square inch do not result in significantly higher efficiency. This value approximates the minimum required to obtain the desired cell capacity of 1.2 A. H. with the thermal process.

The critical nature of the vacuum decomposition treatment has been shown by another series of tests wherein the plates, following the nitrate impregnation treatment, were treated with hot air at atmospheric pressure prior to the vacuum decomposition step. This initial hot air treatment for a specific time would appear to be equivalent to treating the plate thermally for the same period of time and temperature. The reason for this equivalency is based on the fact that during thermal composition hot air is circulated through the oven or reaction vessel to remove the gases produced. The effect on capacity of this partial heating at atmospheric pressure prior to the vacuum decomposition is illustrated by the following examples for comparable weights of active material:

| Amount of active material, gm./in.² | Sealed cell electrode efficiency, percent | |
|---|---|---|
| | 25 minute vacuum decomposition | 5 minute atmospheric heating +25 min. vacuum decomposition |
| .555 | 112.6 | 107.0 |
| .575 | 114.3 | 105.8 |
| .595 | 115.2 | 104.0 |

Larger batches of plaques may be impregnated by my improved thermal decomposition treatment under vacuum in ovens of comparable size by reason of the fact that for standard thermal decomposition the spacing of the plates must be greater to produce the desired weight gain in active material. This is indicated by the following comparative test results:

| Decomposition | Separation between plates, inch | Weight gain active material,[1] gm./in.² |
|---|---|---|
| Thermal | 0.125 | 0.144–.168 |
| | .188 or more | .170–.205 |
| Vacuum | .037 | .170–.216 |
| | .063 or more | .173–.191 |

[1] One impregnation.

I claim:
1. A method of impregnating porous nickel electrodes with positive active material which comprises:
   (a) impregnating the electrode matrices with nickel nitrate solution having a specific gravity of approximately 1.78–1.80 at a temperature within the range 70° C.–100° C. by soaking them in said solution for from two to six minutes;
   (b) draining the excess nickel nitrate solution from the electrode matrices;
   (c) decomposing the nitrate remaining in the pores of the matrices under a vacuum between 40 and 70 centimeters of mercury, at temperatures of from 150° C. to 300° C., for a period of time from about 15 minutes to about 35 minutes;
   (d) soaking the matrices containing the decomposed nitrate in a second solution comprising warm hydroxide selected from the group consisting of KOH and NaOH at a temperature within the range 70° C.–100° C. for a period of 15 minutes;
   (e) separating the electrodes resulting from step (d) from said second solution, and
   (f) washing the electrodes in hot deionized water at temperature not exceeding 100° C.

2. A method in accordance with claim 1 in which the impregnation procedure defined in steps (a)–(f) is repeated until the desired amount of active material is obtained in the electrodes.

3. A method in accordance with claim 1 in which the pH of the nickel nitrate solution is maintained approximately in the range 1.5–2.0 by the addition of an acid.

4. A method in accordance with claim 1 in which the matrices are soaked in the alkaline solution in step (d) at a temperature within the range of ambient room temperature to 100° C. for a period of time sufficient to convert the vacuum decomposition product to active material.

5. A method in accordance with claim 1 in which the alkaline solution used in step (d) is approximately of 10%–25% strength and is maintained at a temperature of from 70°–100° C. for about fifteen minutes.

6. A method in accordance with claim 1 in which the electrodes are soaked in said deionized water for a time within the range two to ten minutes, and the number of soaking treatments is from two to six.

7. A method in accordance with claim 1 in which the electrodes are dried following their washing treatment at a temperature from 250° to about 300° C. under a vacuum within the range 40–70 cm. of Hg.

8. A method in accordance with claim 1 in which the matrices are supported in predetermined spaced parallel relation one to another in said vessel.

9. A method of impregnating porous nickel electrodes with positive active material in accordance with claim 1 in which the soaking of the matrices in the nickel nitrate solution and decomposition of the nitrate in the pores in the matrices is performed in a first vessel and the soaking of the matrices containing decomposed nitrate in a caustic solution and subsequent washing of the electrodes in water is performed in a second vessel.

10. A method of impregnating porous nickel matrices with positive active material comprising: charging a multiplicity of said matrices into a reacton vessel having capacity sufficient to contain a predetermined volume of liquid in addition to the matrices, said vessel being adapted to be closed and heated, and applying to said matrices treatment including the steps of:

(a) heating and filling said vessel with a first solution consisting of molten nickel nitrate at a specific gravity of approximately 1.78–1.80 at a temperature within the range 70° C.–100° C.;

(b) soaking the matrices in said first solution for from two to six minutes while maintaining the temperature of said solution;

(c) decomposing nitrate in the pores of said matrices by drawing a vacuum in said vessel in the range between 40 and 70 centimeters of mercury, raising the temperature thereof to the range of 150° C. to 300° C. and maintaining the temperature and vacuum for a period of time from about 15 minutes to about 35 minutes;

(d) soaking said matrices containing decomposed nitrate in the pores thereof in a second solution comprising a warm hydroxide solution selected from the group consisting of KOH and NaOH at a temperature of from 70° C.–100° C. for about fifteen minutes while maintaining the temperature of the solution;

(e) washing the electrodes resulting from step (d) by soaking them in hot deionized water at temperature not exceeding 100° C. for a predetermined time;

(f) draining the wash water from the electrodes, and (g) repeating steps (e) and (f) for a predetermined number of times.

11. A method in accordance with claim 10 in which the electrodes are dried after each washing treatment.

References Cited

UNITED STATES PATENTS

| | | | |
|---|---|---|---|
| 2,831,044 | 4/1958 | Bourgalt et al. | 136—29 |
| 2,880,257 | 3/1959 | Murphy et al. | 136—29 |
| 3,041,388 | 6/1962 | Fukuda et al. | 136—29 |
| 3,203,879 | 8/1965 | Mueller | 204—56 |

A. B. CURTIS, *Primary Examiner.*

A. SKAPARS, *Assistant Examiner.*

U.S. Cl. X.R.

117—130; 136—76